United States Patent [19]
Peterson

[11] Patent Number: 5,981,672
[45] Date of Patent: Nov. 9, 1999

[54] APPARATUS AND METHOD FOR CONVERTING POLYETHYLENE TEREPHTHALATE INTO POLYESTER POLYOLS

[76] Inventor: Donny L. Peterson, 2117 Opelousas, Houston, Tex. 77020

[21] Appl. No.: 09/160,683

[22] Filed: Sep. 25, 1998

[51] Int. Cl.⁶ .................................................. C08F 2/00
[52] U.S. Cl. .............................. 526/64; 528/272; 526/62; 521/48
[58] Field of Search .............................. 528/272; 526/62, 526/64; 521/48

[56] References Cited

U.S. PATENT DOCUMENTS

| | | |
|---|---|---|
| 3,652,466 | 3/1972 | Hittel et al. . |
| 4,602,046 | 7/1986 | Buser et al. .............................. 521/46 |
| 5,395,858 | 3/1995 | Schwartz, Jr. .............................. 521/48 |
| 5,580,905 | 12/1996 | Schwartz, Jr. .............................. 521/48 |

*Primary Examiner*—Samuel A. Acquah
*Attorney, Agent, or Firm*—Harrison & Egbert

[57] ABSTRACT

An apparatus for converting PET into polyester polyols including a reactor vessel having an interior volume and an inlet and an outlet, a rotation device connected to the reactor vessel for rotating the reactor vessel, and a heater system interactive with the interior of the reactor vessel so as to elevate a temperature of the interior volume of the reactor vessel to at least 175° C. The reactor vessel extends in a generally horizontal orientation. The rotation device includes a roll ring affixed circumferentially around the reactor vessel, a drive roller engaging the roll ring and a motor connected to the drive roller for drivingly rotating the drive roller and the associated roll ring. The heater system includes a plurality of heating pipes extending through the interior volume of the reactor vessel and a heated fluid injector connected to the plurality of heating pipes for passing a heated fluid into the pipes. The heating pipes extend longitudinally through the reactor vessel in generally parallel relationship to each other and in parallel relationship to the longitudinal axis of the reactor vessel. A heating fluid inlet manifold is formed in the reactor vessel and a heating fluid discharge manifold is formed in the reactor vessel. Each of the pipes communicates with these manifolds.

32 Claims, 4 Drawing Sheets

APPARATUS AND METHOD FOR CONVERTING POLYETHYLENE TEREPHTHALATE INTO POLYESTER POLYOLS

TECHNICAL FIELD

The present invention relates to processes for recycling polymeric material. More particularly, the present invention relates to apparatus and methods for the converting of polyethylene terephthalate plastics into polyester polyols. More particularly, the present invention relates to configurations of reactors for carrying out such a process.

BACKGROUND ART

Polyester is a polymeric material made from the esterification of polybasic organic acids with polyhydric alcohols. One exemplary polyester is manufactured by reacting dimethyl terephthalic acid with ethylene glycol so as to result in a compound chemically known as polyethylene terephthalate and commonly identified as PET. Polyesters are currently used as a base material in a wide variety of applications. For example, polyester is commonly used to make photographic films, x-ray films, bases for magnetic coating such as in recording tapes, beverage containers, surgical aids such as synthetic arteries, and as a fabric for making garments and other similar items. However, although polyester is very useful, the waste materials containing polyester are beginning to create a waste management and disposal problem.

Currently, those skilled in the art are seeking different methods for recovering and reusing polyester contained in waste PET plastic products. However, recovery of polyester from waste products has been difficult. In particular, many of the prior art processes are not capable of efficiently or economically recovering polyester due to non-PET contaminants and low densification.

Fundamentally, the process of converting polyethylene terephthalate to a polyester polyol involves the process for "cracking back". This "crack back" process is essentially one of heating the polyethylene terephthalate in the presence of excess amounts of glycols, alcohols, or other suitable polyols, such that a retrodegradation of the polymer molecule chain takes place. In the extreme case, monomer units of the acids and glycol can be produced. Lower molecular weight oligomers consisting of one to approximately twenty glycol and acid units depending on the desired properties of the end product is the goal of this conversion process.

This chemical process is generally referred to as transesterification whereby an excess of glycol is added and chemically attacks the ester bonds in the PET so as to break the existing ester bonds. Immediately thereafter, form new ester bonds form between the attacking glycols and the acid moieties which remain from cleaving the first ester bonds. The glycols of choice for such a process are diethylene glycol and propylene glycol. However, any glycol, alcohol or polyol with liquid temperatures less than the softening/melting temperature of the PET (approximately 175° to 250° C.) can be employed. The net result of this chemical reaction as the process proceeds is to change the ratio of reacted terephthalic acid to reacted glycol in the PET polymer from approximately 1.0 in the original starting material toward a theoretical limit of 0.5. In general, the final ratio will be in the range of 0.5 to 0.75.

This chemical process is shown chemically hereinbelow:

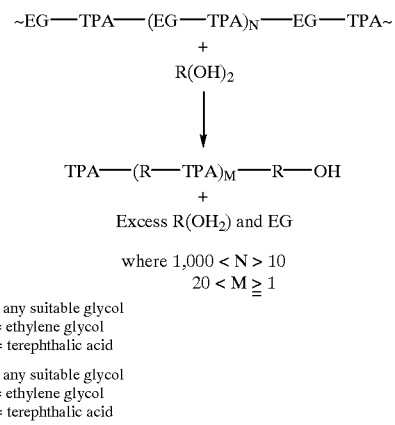

where $1{,}000 < N > 10$
$20 < M \geq 1$ $R(OH)_2$ = any suitable glycol
EG = ethylene glycol
TPA = terephthalic acid $R(OH)_2$ = any suitable glycol
EG = ethylene glycol
TPA = terephthalic acid The rate of reaction is a function of the temperature, pressure and the degree to which the excess glycol and PET can be brought into intimate contact with one another. The process will proceed optimally at and beyond the temperature point where the PET has been converted to a melting stage in the presence of a suitable glycol raised to that same temperature. This is in the range of 175° to 250° C. Higher temperatures will increase the rate, but at a minimum, a melted state for the PET is needed in order to get commercially acceptable rates of reaction. For lower boiling glycols and alcohols, such as propylene glycol, the reaction vessel must be capable of maintaining pressure in order to permit heating these glycols to the minimum acceptable range of 230° to 250° C.

Given that acceptable temperatures and pressures can be achieved, the limiting parameter for the process becomes the degree to which intimate contact between the reactants can be maintained. For the PET crack back process, this is especially important. The free fall density of the PET raw material itself will generally be significantly less than that of the glycols used as the other reactant. The form of the PET can vary from very thin films and fiber types to granulated, flaked or pelletized types. The film and fiber types are the lowest density forms and the flaked, pelletized and granulated types are of the highest density forms. The use ratios between the PET and the glycols are typically in the range of about 60% to 150% by weight of glycol to the weight of the PET. In examples where the amount of glycol and PET by weight are equal, the volume occupied by the glycol may be from 20% to 60% of the volume of the PET depending on the free fall density of the PET which depends on its form. In examples of product where the amount of glycol needs to be less by weight than the weight of PET, the relative amount of volume occupied in a reaction vessel naturally becomes less.

In the prior art, so as to carry out such crack back processing, a vertical reactor has been employed with an agitator employing several sets of impeller blades so as to mix the ingredients and to keep the contents homogeneously dispersed. The typical vertical processing reactor has heat exchange from an outside source to the reactor contents by use of a hot oil or steam jacket mounted on the sidewalls and possibly the bottom cone of the reactor or by use of an internal coiled tube to convey the hot oil or steam mounted along the sidewalls of the reactor. In either case, the heat source for the reactor contents is mainly, if not exclusively, along the sidewalls of the reactor. Thus, the ability to provide good efficient heat transfer to the contents depends to a very significant degree on the agitator mixing and dispersing action such that materials heated at the sidewalls are continuously replaced by unheated materials away from the sidewall. This dispersing of the heat along with the contents is necessary so as to create the greatest efficiency in the heating process in addition to keeping the mixture homogeneous.

The major difficulty with crack back processing of PET by these conventional prior art vertical reactors is that the low density PET is both difficult to disperse by typical agitation and that the PET itself acts as a very poor conductor of heat. Thus, under typical conditions, when the necessary charges of PET and glycol are added together, the glycol portion occupies only a small portion of the space at the bottom of the reactor and the solid PET fills from the bottom of the reactor to the uppermost level. The glycol/PET lower occupied portion of the reactor, being a liquid with mixed solids, can be agitated provided that the lower impellers reach that lower level of the reactor. The "PET only" occupied portion of the reactor cannot be effectively agitated and, therefore, the heat produced from the sidewalls cannot be readily dispersed to those portions of the contents away from the sidewalls. Furthermore, the relatively low density PET material is a very poor conductor of heat. The net effect of these difficulties is that the PET contents in the upper areas of the reactor are very slow to heat and reach the melt point needed to make the process effective. The mixed glycol/PET contents in the lower part of the reactor can be effectively heated and possibly agitated. This becomes the only region of the reactor that is effectively participating in the chemical process of cracking back the PET. As this region completes the crack back process, and the excess glycol and now liquid cracked back polyol in that region forms, the PET from the upper regions of the reactor can become incorporated into this now-liquid region and can be cracked back as well. This becomes a very protracted process and is not very favorable to commercial conversions.

In the past, various patents have issued relating to the process for converting PET into polyesters. U.S. Pat. No. 4,602,046 discloses a method for the recovery of polyester from scrap material, such as photographic film, having a polyester base. The scrap material is cut or chopped into small individual pieces or flakes and treated in a caustic alkaline solution at a solids level of at least 25% by volume and under conditions of high shear.

U.S. Pat. No. 3,652,466 discloses another process of recovering the polyester from polyester films. The coated films are cut into small pieces and treated with a caustic aqueous alkali solution to form a slurry. The slurry is fed into a classification column in which the pieces move downward countercurrent to a moving column of aqueous liquid which separates the pieces from the coating material. The pieces are removed from the bottom of the column in suspension and can thereafter be used as a source of polyester material.

U.S. Pat. No. 5,395,858, issued on Mar. 7, 1995 to J. A. Schwartz, Jr. describes a process for recycling polyester contained in waste materials. The polyester is converted into ethylene glycol and terephthalic acid. The process includes first combining materials containing polyester with an alkaline solution so as to form a slurry. The slurry is heated so as to cause ethylene glycol to evaporate. The remaining product stream is then mixed with water and filtered to remove any undissolved impurities. The aqueous filtrate can be acidified causing terephthalic acid to precipitate. U.S. Pat. No. 5,580,905, issued to the same inventor, describes a similar process.

It is an object of the present invention to provide an apparatus and method which effectively and efficiently converts waste PET materials into an polyester polyols.

It is another object of the present invention to provide an apparatus and method which facilitates the ability to intimately mix the glycol with the PET on the interior of the reactor vessel.

It is another object of the present invention to provide an apparatus and method which assures the optimum recovery of polyester polyols from a charge of PET and glycol.

It is still another object of the present invention to provide a method and apparatus which facilitates the loading of scrap PET material into the reactor vessel.

It is still another object of the present invention to provide a method and apparatus which more effectively transmits heat thoroughly throughout the mixture of glycol and PET on the interior of the reactor vessel.

It is still another object of the present invention to provide a method an apparatus which is easy to use, easy to manufacture and relatively inexpensive.

These and other objects and advantages of the present invention will become apparent from a reading of the attached specification and appended claims.

SUMMARY OF THE INVENTION

The present invention is an apparatus for converting PET into polyester polyols comprising a reactor vessel, a rotation means connected to the reactor vessel for rotating the reactor vessel, and a heating means interactive with an interior of the reactor vessel so as to elevate a temperature of the contents of the interior volume of the reactor vessel to at least 175° C. The reactor vessel extends in a generally horizontal orientation.

The present invention further includes a PET loading means detachably connected to the inlet of the reactor vessel. This loading means serves to load PET to the interior volume of the reactor vessel. A glycol loading means is detachably connected to the inlet of the reactor vessel. The glycol loading means serves to introduce the glycol into the interior volume. The PET loading means specifically includes a PET storage container having an interior for receiving PET therein and a screw auger connected to the bottom of the PET storage container. The screw auger has an end opposite the PET storage container suitable for introducing into the inlet of the reactor vessel. The screw auger is adapted for moving the PET from the PET storage container to the end of the screw auger. The inlet of the reactor vessel has a hatch which is removably connected to the reactor vessel. The hatch has a vapor removal line connected thereto which is adapted for passing vapors outwardly of the reactor vessel.

In the present invention, a platform supports the reactor vessel. A base is positioned below the platform so as to support the platform in a desired horizontal orientation. A pivoting mechanism is connected to the base and the platform. This pivoting mechanism serves to move the reactor vessel angularly such that the inlet of the reactor vessel resides at a higher elevation above the base than does the outlet. Specifically, a hydraulic ram is positioned on the base and has an end abutting the platform so as to push the platform upwardly such that the platform will pivot and extend angularly upwardly.

In the present invention, the rotation means includes a first roll ring which is affixed circumferentially around the reactor vessel, a drive roller engaging the first roll ring, and a motor connected to the driver roller. The motor drivingly rotates the drive roller so as to consequently rotate the roll ring. A second roll ring is also affixed circumferentially around the reactor vessel in spaced parallel relationship to the first roll ring. The second roll ring engages an idler roller. A positioning roller rotatably contacts a side surface of the second roll ring. This positioning roller has an axis of rotation which extends generally transverse to the longitudinal axis of the reactor vessel.

In the present invention, the heating means includes a plurality of heating pipes which extend through the interior volume of the reactor vessel. A heated fluid injection means is connected to the plurality of heating pipes so as to pass a heated fluid into the plurality of heating pipes. The plurality of heating pipes each extend longitudinally through the reactor vessel adjacent to an inner wall of the reactor vessel. Each of the heating pipes has a longitudinal axis in generally parallel relationship to the longitudinal axis of the reactor vessel. Each of the heating pipes is in generally parallel relationship to an adjacent heating pipe. The heating means further includes a heating fluid inlet manifold formed in the reactor vessel and a heating fluid discharge manifold formed in the reactor vessel. Each of the plurality of heating pipes communicates with the heating fluid inlet manifold and with the heating fluid discharge manifold. Each of the heating pipes includes an outer pipe having an interior passage communicating with the heating fluid inlet manifold and an innerpipe extending interior of the outer pipe. The inner pipe communicates with the heating fluid discharge manifold. The inner pipe opens to an outer pipe at an end opposite the heating fluid discharge manifold.

The present invention is also a process for converting PET into polyester polyols which comprises the steps of: (1) forming a reactor vessel having an inlet and an outlet; (2) loading a glycol into the interior volume through the inlet; (3) loading PET into the interior volume through the inlet; (4) heating the interior volume of the reactor vessel to a temperature of at least 230° C.; (5) rotating the reactor vessel so as to mix the glycol and the PET in the heated interior volume for a desired period of time; and (6) discharging the polyester polyols from the outlet of the reactor vessel. The reactor vessel is rotated about a horizontal axis. The step of forming includes affixing a plurality of heating pipes in the reactor vessel such that the heating pipes extend longitudinally through the interior volume. The step of passing a heated fluid through the plurality of heating pipes occurs during the step of rotating. The reactor vessel is angularly elevated during the step of loading PET.

DETAILED DESCRIPTION OF THE PRESENT INVENTION

Figure 1:
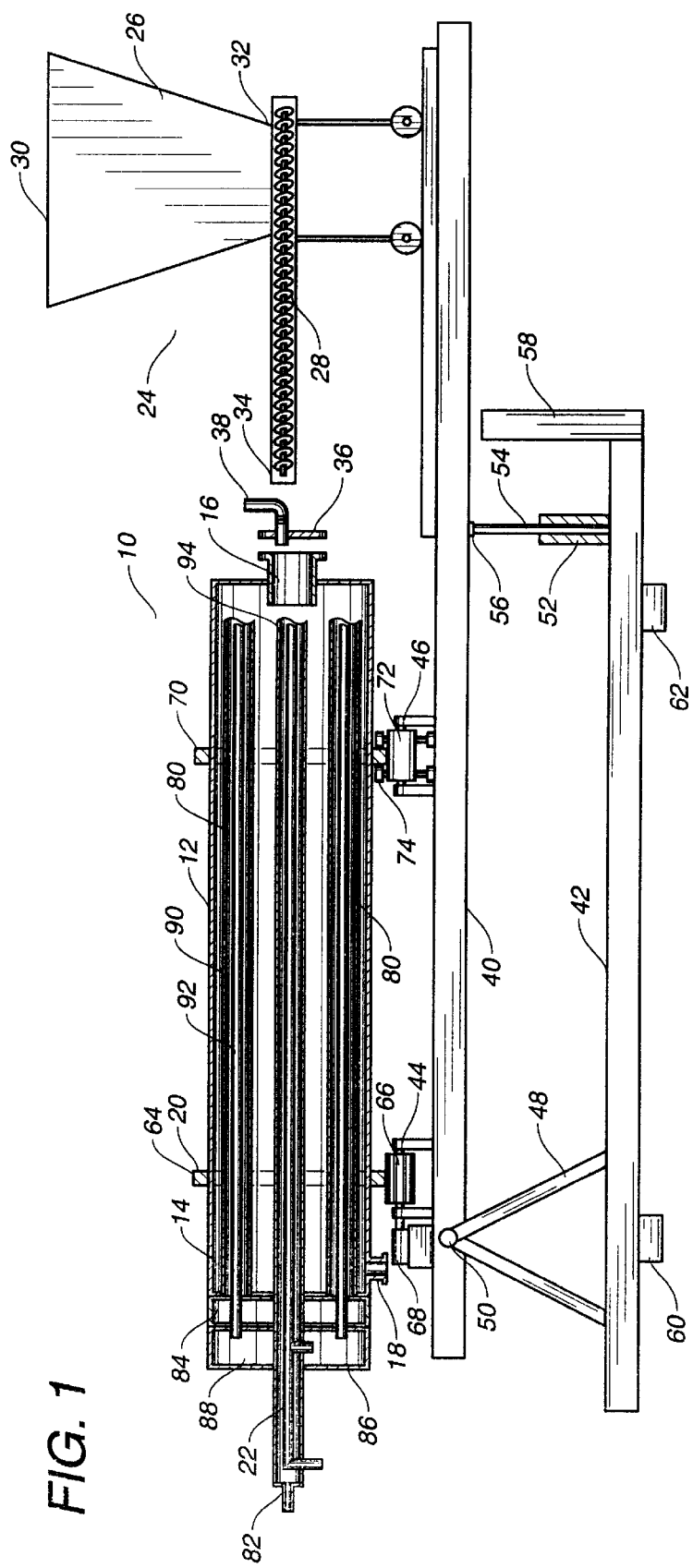
FIG. 1 is a side cross-sectional view of the apparatus in accordance with the preferred invention as shown in a horizontal orientation.

Referring to FIG. 1, there is shown at 10 the apparatus for converting PET into unsaturated polyesters. The apparatus 10 includes a reactor vessel 12 having an interior volume 14 and an inlet 16 and an outlet 18. A rotation device 20 is connected to the reactor vessel 12 so as to rotate the reactor vessel. A heating system 22 is employed so as to be interactive with the interior 14 of the reactor vessel 12. The heating system 22 serves to elevate the temperature of the interior volume 14 of the reactor vessel 12 to a temperature of at least 175° C.

In the present invention, there is an apparatus for allowing the loading of PET into the interior volume 14 of the reactor vessel 12. This loading system 24 includes a PET storage container 26 and a screw auger 28. The PET storage container 26 is a hopper with a wide top 30 and a narrow bottom 32. The narrow bottom 32 is connected so as to communicate with the interior of the screw auger 28. The screw auger 28 has an end 34 to which the screw auger 28 delivers the PET material. The end 34 is suitable for being introduced into the inlet 16 of the reactor vessel 12. As such, the screw auger 28 will serve to transport the PET material from the storage container 26 into the interior volume 14 of the reactor vessel 12.

A hatch 36 is removably connected to the inlet 16 of the reactor vessel 12. The hatch 36 has a glycol loading conduit 38 attached thereto. This glycol loading conduit 38 is suitably connected to the hatch 36 and to the inlet 16 so as to allow a sufficient volume of glycol to be introduced into the interior volume 14 of the reactor vessel 12. The glycol loading conduit 38 can, alternatively, function as a vapor removal line. The vapor removal line 38 is adapted for passing vapors outwardly of the reactor vessel 12 during the process of converting the PET into the unsaturated polyester.

The reactor vessel 12 and the PET loading system 24 are supported on a platform 40. The platform 40 extends in a horizontal orientation. A base 42 is positioned below the platform 40 in generally parallel relationship (as shown in FIG. 1). The base 42 is designed so as to support the platform 40 in a desired orientation. The reactor vessel 12 is supported on the top surface of platform 40 through the rotation device supports 44 and the rotation device supports 46. The rotation device supports 44 and 46 serve to allow the reactor vessel 12 to rotate and to maintain the reactor vessel 12 in parallel relationship to the platform 40. Support legs 48 extend upwardly from the base 42 to a pivot point 50 located on the platform 40. A hydraulic ram 52 is provided on the base 42 distal of the support legs 48 and the pivot point 50. The hydraulic ram 52 includes a piston 54 which has an end 56 abutting the underside of the platform 40. A stop member 58 is provided at the end of the base 42 opposite the support legs 48 so as to provide a limit to the downward travel of the platform 40 relative to the base 42. Load sensors 60 and 62 are provided on the underside of the base 42. Load sensors 60 and 62 can provide information so as to determine the amount of PET material and glycol material which are introduced and/or removed from the reactor vessel 12.

The rotation mechanism 20 of the apparatus 10 of the present invention includes a first roll ring 64 which is affixed circumferentially around the reactor vessel 12. A driver roller 66 engages the first roll ring 64. A motor 68 is interconnected by gears, chains, or direct shaft-to-shaft relationship with the drive roller 66. The motor 68 serves to drivingly rotate the drive roller 66 so as to consequently rotate the first roll ring 64 and the reactor vessel 12. A second roll ring 70 is affixed circumferentially around the reactor vessel 12 in spaced parallel relationship to the first roll ring 64. An idler roller 72 engages the second roll ring 70 so as to allow the reactor 12 to suitably rotate in its horizontal orientation. A positioning roller 74 rollably contacts a side surface of the second roll ring 70. Positioning roller 74 has an axis of rotation generally transverse to the longitudinal axis of the reactor vessel 12.

In the present invention, the heating system includes a plurality of heating pipes 80 extending through the interior volume 14 of the reactor vessel 12. A heated fluid injection system 82 is connected to the plurality of heating pipes 80 so as to pass a heated fluid to the plurality of heating pipes. Each of the heating pipes 80 extends longitudinally through the reactor vessel 12 adjacent an inner wall of the reactor vessel. Each of the plurality of heating pipes 80 has a longitudinal axis in generally parallel relationship with the longitudinal axis of the reactor vessel 12. Each of the plurality of heating pipes 80 is in generally parallel relationship with an adjacent heating pipe. A heating fluid inlet manifold 84 is formed in the reactor vessel 12 adjacent to the end 86 of the reactor vessel 12. A heating fluid discharge manifold 88 is also formed in the reactor vessel 12 at such end 86. Each of the heating pipes 80 communicates with the heating fluid inlet manifold 84 and the heating fluid discharge manifold 88.

As will be described hereinafter, each of the plurality of heating pipes includes an outer pipe 90 having an interior passageway communicating with the heating fluid inlet manifold 84 and an inner pipe 92 communicating with the heating fluid discharge manifold 88. The inner pipe 92 opens to the outer pipe 90 at end 94.

Figure 2:
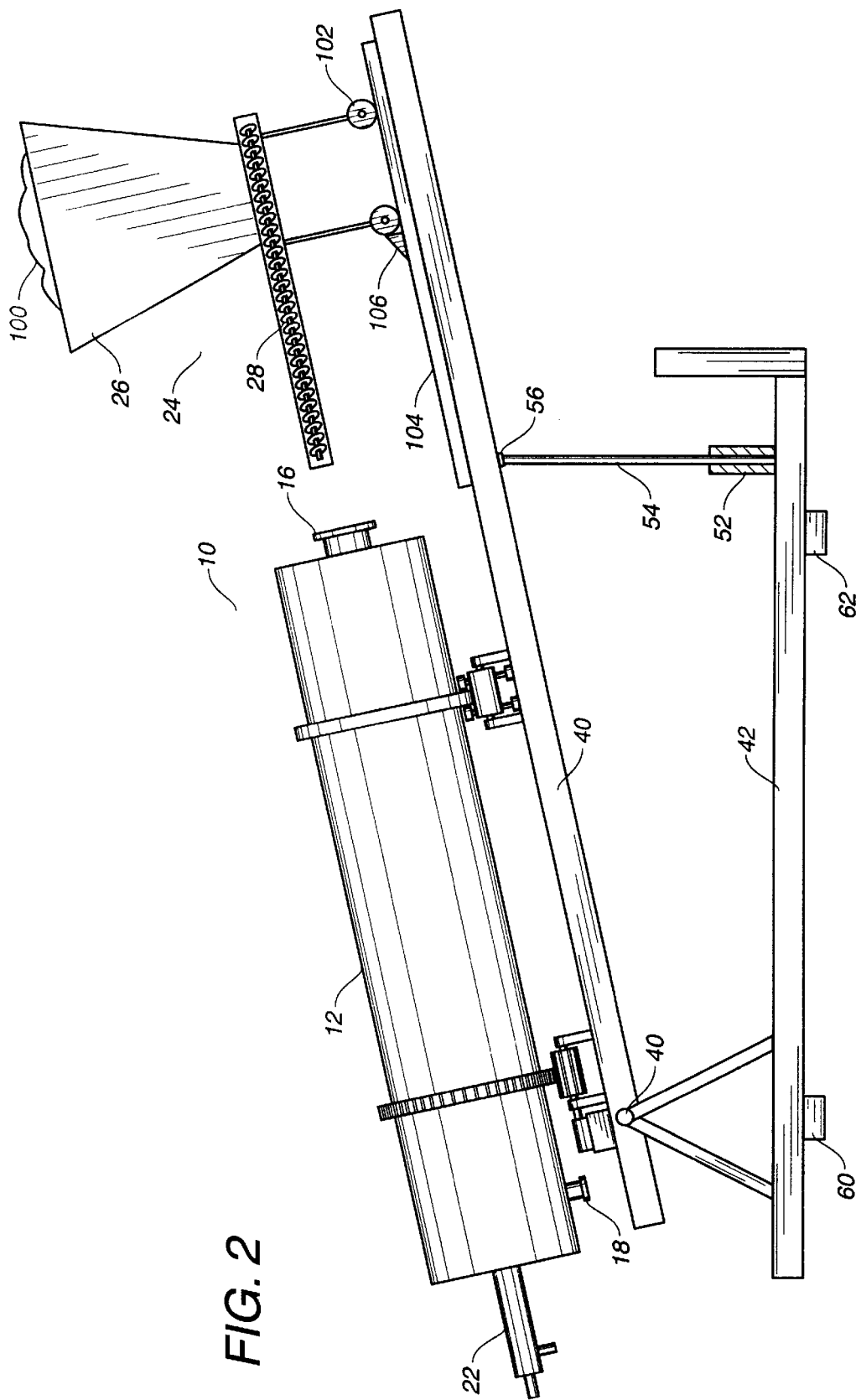
FIG. 2 is a side elevational view of the apparatus of the present invention showing the apparatus in its elevated position for loading.

FIG. 2 shows a side view of the apparatus 10 of the present invention. In FIG. 2, the apparatus 10 is shown in a suitable condition for loading. As can be seen, the reactor vessel 12 is supported on the platform 40. The platform 40 is pivoted upwardly by an actuation of the hydraulic ram 52. The hydraulic ram will cause piston 54 to move upwardly such that the end 56 causes the platform 40 to move angularly upwardly such that the inlet 16 of the reactor vessel 12 is at an elevated position relative to the outlet 18. The platform 40 will pivot relative to the pivot point 50. So as to allow the PET material 100 to be introduced into the interior of the reactor vessel 12, the screw auger 28 is activated so as to draw the PET material 100 from the PET storage container 26 toward the end 34. The end 34 is inserted into the inlet 16 for a desired distance. Since the screw auger 28 is supported on wheels 102 on the platform 40, the PET storage system can be easily rolled along surface 104 until the end 38 resides on the interior of the reactor vessel 12. A suitable amount of PET material can be introduced into the interior of the reactor vessel 12 until the load sensors 60 and 62 signal that a suitable quantity has been received. A chock block 106, or other means, can be used so as to retain the PET loading system 24 in a desired position relative to surface 104 during the angular upward movement of the platform 40. When the chock block 106 is removed, the wheels 102 will allow the PET loading system 24 to be easily rolled along the surface 104 to its desired location.

Figure 3:
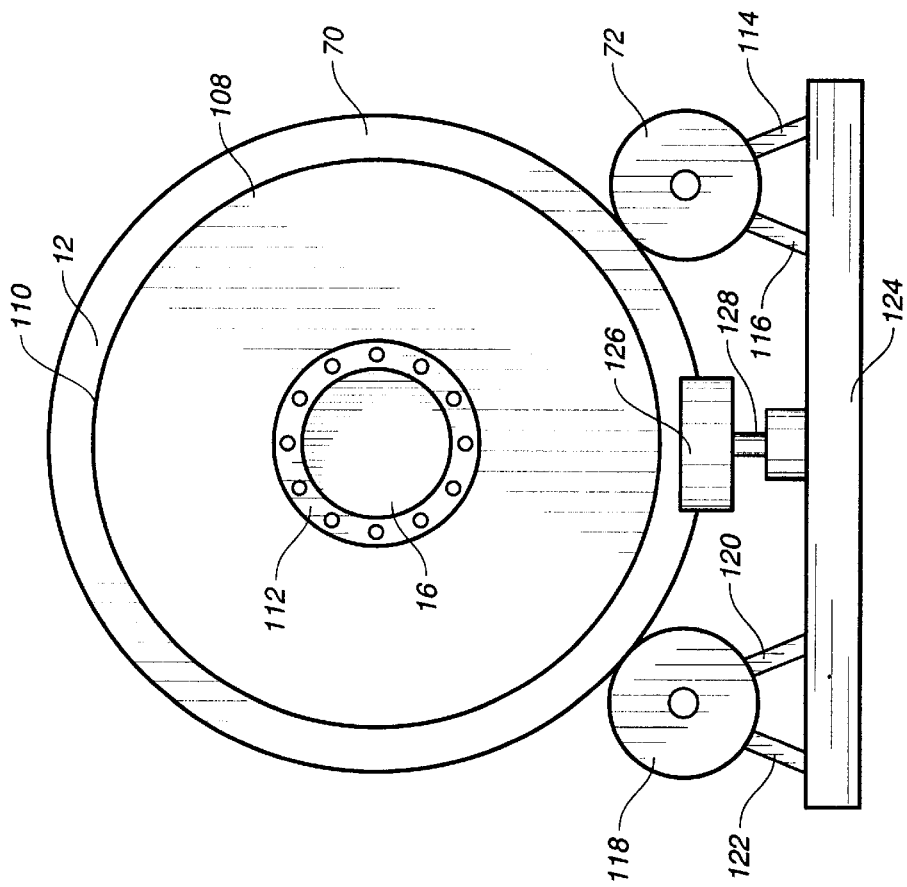
FIG. 3 is an end view of the inlet of the present invention.

FIG. 3 shows an end view of the reactor 12 at the inlet 16. As can be seen, the inlet 16 is an opening in the end 108 of the reactor vessel 12. The second roll ring 70 is illustrated as extending around the exterior surface 110 of the reactor vessel 12. It can be seen that the inlet 16 is located generally centrally of the end 108 of the reactor vessel 12. A suitable flange 112 can be provided on the inlet 106 so as to allow for the securing of the hatch 36 thereon.

In FIG. 3, an idler roller 72 is shown as supported on the support legs 114 and 116. The surface of the idler roller 72 will engage the second roll ring 70 so as to assure the proper positioning of the reactor vessel 12. Another idler roller 118 is provided on the other side of the second roll ring 70. The second idler roller 118 is supported on legs 120 and 122 above support 124.

So as to assure that the reactor vessel 12 is retained in its proper position upon the roller supports 44 and 46, it is necessary to prevent the second roll ring from sliding along the surface of the roller 72 and 118 when the reactor vessel 12 is inclined angularly upwardly. As such, a positioning roller 126 is provided so as to retain the second roll ring 70 in its desired position. The positioning roller 126 rollably contacts a side surface of the second roll ring 70. The positioning roller 126 has an axis of rotation 128 which extends generally transverse to the longitudinal axis of the reactor vessel 12. The positioning roller 126 will roll freely as the second roll ring 70 and the reaction vessel 12 rotate relative to the rollers 72 and 118.

Figure 4:
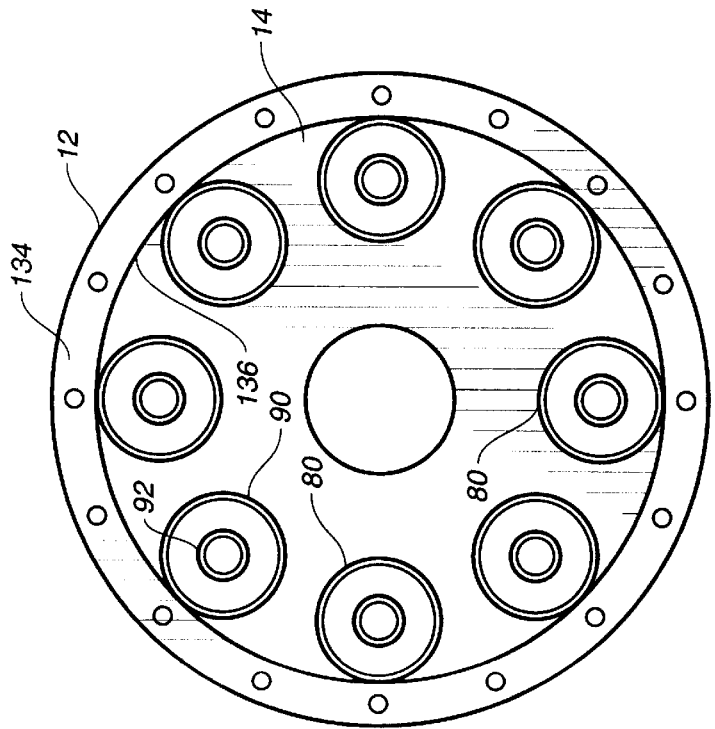
FIG. 4 is a cross-sectional view of the interior of the reactor vessel of the present invention.

FIG. 4 shows the opposite end of the reactor vessel 12. Importantly, it can be seen that the manifolds 84 and 88 can be suitably bolted onto the end surface 134 of the reactor vessel 12. The heating pipes 80 extend through the interior 14 of the reactor vessel 12. As can be seen, each of the heating pipes 80 includes an outer pipe 90 and an inner pipe 92. Each of the heating pipes is arranged in generally parallel relationship to an adjacent heating pipe. The heating pipes 80 are all arranged adjacent to the inner wall 136 of the reactor vessel 12. As will be described hereinafter, this arrangement assures that the maximum heating and mixing effect is created on the interior 14 of the reactor vessel 12.

Figure 5:
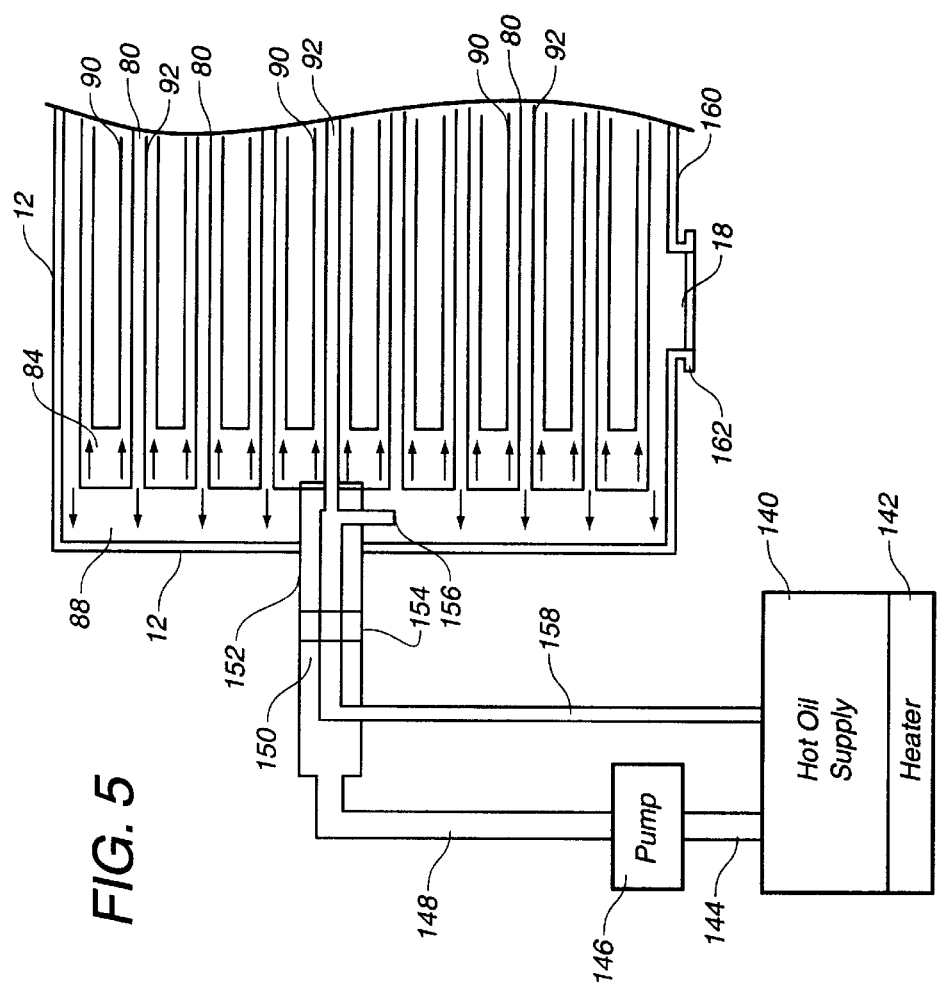
FIG. 5 is a diagrammatic cross-sectional view showing the operation of the heating system of the present invention.

FIG. 5 illustrates, diagrammatically, the manner in which heating fluid is passed to each of the heating pipes 80 on the interior of the reactor vessel 12. Initially, there is a heated fluid supply tank 140 which is supplied with a reservoir of fluid, preferably oil. A suitable heating mechanism 142 is associated with the fluid supply so as to assure that the fluid is adequately heated. A conduit 144 will connect the fluid supply 140 with a pump 146. The pump 146 will draw the heated fluid from the fluid supply 140 through line 148 and into the pipe 150. Pipe 150 is joined to a pipe 152 extending from the reactor vessel 12 through the use of a rotary union 154. Rotary union 154 assures that the pipe 150 is retained in proper alignment with the pipe 152 throughout the rotation of the reaction vessel 12. The pipe 150 and the pipe 152 allow the heated fluid to pass therefrom into the interior of the heating fluid inlet manifold 84. Manifold 84 will fill with fluid during the rotation of the reactor vessel 12. As indicated by the arrows, the heated fluid within the heating fluid manifold 84 will enter the interior of the outer pipes 90. The heated fluid will travel in the annulus formed between the outer pipe 90 and the inner pipe 92 throughout the length of each of the pipes 80. At the opposite end of the pipes, the outer pipe 90 will have a closed end. The inner pipe 92 will be open inwardly of that closed end. After the heated fluid is passed through the length of the outer pipe 90 it will be redirected to pass back through the interior of the inner pipe 92. Eventually, the cooled fluid will pass outwardly from the inner pipe 92 and into the heating fluid discharge manifold 88. Ultimately, the discharged heating fluid will enter inlet 156 and enter the discharge line 158 so as to be delivered back to the fluid supply tank 140.

As can be seen in FIG. 5, a large number of heating pipes 80 are illustrated. Ideally, and preferably, the number of heating pipes should be at least forty-eight pipes within the interior of the reactor vessel 12. However, the reaction associated with the present invention will occur properly if fewer pipes are used.

FIG. 5 also shows the outlet 18 of the reactor vessel 12. It can be seen that the outlet 18 opens along a wall 160 of the reactor vessel 12. A hatch 162 can keep the outlet 18 closed during the rotation of the reactor vessel 12. After the reactor vessel 12 has rotated for a desired period of time and the proper reaction has been carried out, the hatch 162 can be opened so that the unsaturated polyester can be removed from the interior 14 of the reactor vessel 12. During the process, vapors can pass outwardly of the interior 18 through the vapor outlet 38 formed on hatch 36.

Figure 6:
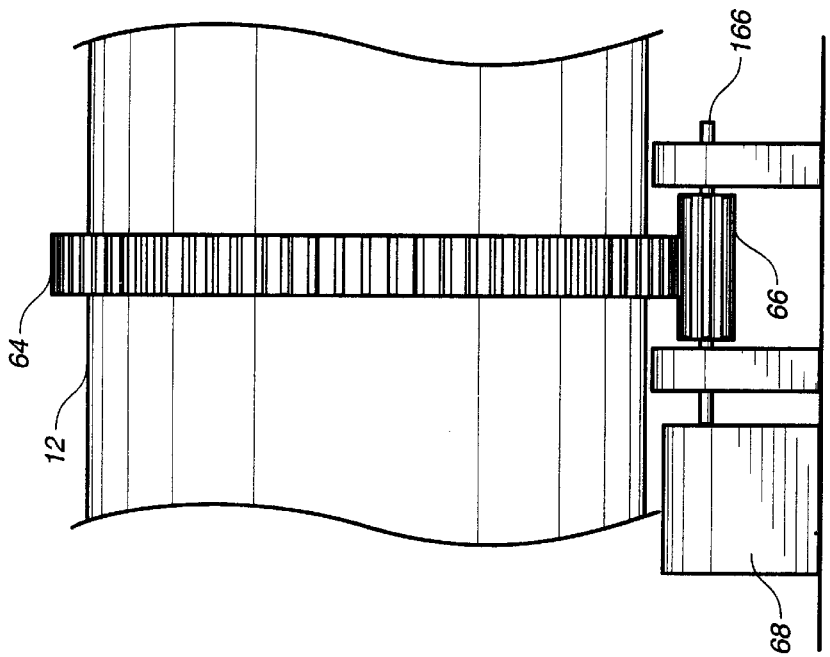
FIG. 6 is a detailed view showing the rotation means of the present invention.

FIG. 6 illustrates, in detail, the first roll ring 64. As can be seen, the first roll ring 64 is a bull gear which is affixed around the circumference of the reactor vessel 12. A drive roller 66 will engage the first roll ring 64 in a toothed relationship. The drive roller 66 is supported on shaft 166. Shaft 166 is connected to a drive motor 68. As the drive motor rotates the shaft 166, the drive roller 66 will rotate so as to cause a corresponding rotation of the first roll ring 64 and the attached reactor vessel 12.

The present invention provides a commercially viable process, especially with lower density PET. The present process provides very close contact between the reactants along with efficient heat transfer. This process occurs because the reactor is in a horizontal rather than in a vertical configuration.

Initially, the PET material is loaded into the inlet 16 and into the reactor 12 by way of the auger 28. This loading can be facilitated by tumbling the reactor 12 while it is being loaded to aid in distributing the material along the length of the reactor 12. Also, as was illustrated in FIG. 2, the angle of the reactor 12 can be tilted away from being completely horizontal so that the loading end 16 is higher than the closed end 86 to facilitate moving the PET material to the end opposite the inlet 16. The tilting also allows more material to be loaded into the reactor 12 since the lower lip of the inlet 16 is a limiting factor on how much material can be added before spillage to the outside of the reactor will occur. After the desired amount of PET has been loaded into the inlet 16, the inlet 16 is closed and the desired amount of glycol is added by way of the flexible hose 38 through a universal rotary valve that is fitted to the hatch 36 on the inlet 16.

The contents of the reactor 12 are heated by heat exchange with heated oil that is continuously flowing through the pipes 80 which are mounted along the length of the reactor 12. An external hot oil heater 140 and pump 146 are provided so as to supply the heated oil. The reactor 12 may be heated before, during or after the contents have been added. Preferably, the reactor 12 is preheated to a safe temperature approaching that of the target temperature of the reaction prior to loading the PET and glycols. This will serve to reduce the overall conversion time for the process.

The mixing of the contents is accomplished by rotation of the reactor 12 by means of the drive roller engaging the ring roller that extends around the circumference of the reactor 12. The weight of the reactor is supported by two sets of freely turning rollers. These rollers facilitate the rotation of the reactor 12. A fixed connection to the hot oil and other units, separate from the reactor itself, can be accomplished through universal rotary unions mounted at the center of the ends of the reactor 12. The pipes which are mounted along the length of the reactors are mounted in such a way as to act as lifters for the solid materials in the reactor 12. As the reactor 12 rotates, the materials are carried around the circumference to a region near the top of the rotation before falling off onto accumulated materials in the lower portion of the reactor. By this means, fresh material is continuously resupplied to the walls of the reactor 12 and is thereby brought into contact with the pipes 80 so as to facilitate the heat transfer to the reactor contents. Most of the liquid glycol remains in the lower portion of the reactor and is therefore heated by the pipes 80 as they pass through the glycol as the reactor rotates. Also, the heated glycol in the lower half of the reactor 12 is continuously being brought into contact with fresh PET material through the tumbling action. This greatly facilitates heat transfer to the contents. As an added benefit to both the heat transfer and to the chemical interactions, the glycol, after a short period of mixing, becomes distributed over all of the PET surface area to ensure intimate contact of the reactants. After suitable reaction intervals, samples of the product are taken and tested for specifications relating to viscosity and the completeness of the reaction. When the reaction is determined to be complete, the product is discharged to an intermediate storage tank where it is cooled before filtering and final storage or disposition. The steps of reloading the reactor with fresh contents can be started. Also, the reactor can be maintained in its high temperature state to facilitate the heating of the next batch of materials.

For the processing of certain materials, the use of a condenser column will be desirable or required. The condenser column will be attached by way of a flexible hose, such as hose 38, which can be attached to a hose coupling at the center of the inlet 16 used for the loading of the PET. This hose can be connected by way of a universal rotary connection. This is the same connection that was also used to introduce the glycol to the reactor 12 at the loading stage of the process. The condenser can be brought into service by use of a valve that can close off access to the flexible hose 38. The purpose of the condenser is to provide a means of pressure relief following the closed reactor operating conditions or if operating at atmospheric as needed. Glycol vapors collect in the head space of the reactor as the glycols are heated up. Also, as the transesterification reaction proceeds, ethylene glycol from the PET is released as free glycol which will also contribute to the vapor pressure. In some product formulations, it is desirable to remove as much of the ethylene glycol as possible and to as completely as possible replace the ethylene glycols with the other glycols being added to the formulation. In another example of the use of the condenser column, it is desirable, in some cases, to use excess amounts of added glycol greater than what the final formulation calls for. The processing speed of the transesterification reaction can be significantly increased by the use of these large excesses of added glycol. However, this excess glycol needs later to be removed from the final product. This can be accomplished by allowing the glycol vapor to escape to the condenser where it can be collected, measured and saved for future use before the discharge of the final product with the desired ratios of PET and glycol.

The foregoing disclosure and description of the invention is illustrative and explanatory thereof. Various changes of the details of the illustrated construction or in the steps of the described method can be made within the scope of the appended claims without departing from the true spirit of the invention. The present invention should only be limited by the following claims and their legal equivalents.

I claim:

1. An apparatus for converting PET into polyester polyols comprising:

a reactor vessel having an interior volume, said reactor vessel having an inlet and an outlet, said reactor vessel extending in a generally horizontal orientation;

a rotation device connected to said reactor vessel, said rotation device adapted for rotating said reactor vessel; and a heater interactive with an interior of said reactor vessel, said heater adapted for elevating a temperature of said interior volume of said reactor vessel to at least 175° C.

2. The apparatus of claim 1, further comprising:

a PET loader detachably connected to said inlet of said reactor vessel, said PET loader for loading PET into said interior volume of said reactor vessel.

3. The apparatus of claim 2, further comprising:

a glycol loader detachably connected to said inlet of said reactor vessel, said glycol loader for introducing a glycol into said interior volume.

4. The apparatus of claim 2, said PET loader comprising:

a PET storage container having an interior for receiving PET therein; and a screw auger connected to a bottom of said PET storage container, said screw auger having an end opposite said PET storage container suitable for introduction into said inlet of said reactor vessel, said screw auger adapted for moving PET from said PET storage container to said end of said screw auger.

5. The apparatus of claim 1, said inlet comprising:

a hatch removably connected to said reactor vessel, said hatch having a vapor removal line connected thereto, said vapor removal line adapted for passing vapors outwardly of said reactor vessel.

6. The apparatus of claim 1, further comprising:

a platform supporting said reactor vessel;

a base positioned below said platform, said base supporting said platform in a desired orientation; and a pivoting mechanism connected to said base and said platform, said pivoting mechanism for moving said reactor vessel angularly such that said inlet of said reactor vessel resides at a higher elevation above said base than said outlet.

7. The apparatus of claim 6, said pivoting mechanism comprising:

a pivot connected to said platform proximal one end of said platform; and a hydraulic ram positioned on said base and abutting said platform distal said pivot.

8. The apparatus of claim 1, said rotation device comprising:

a first roll ring affixed circumferentially around said reactor vessel;

a drive roller engaging said first roll ring; and a motor connected to said drive roller, said motor adapted for drivingly rotating said drive roller so as to consequently rotate said first roll ring.

9. The apparatus of claim 8, further comprising:

a second roll ring affixed circumferentially around said reactor vessel in parallel relation to said first roll ring; and an idler roller engaging said second roll ring.

10. The apparatus of claim 9, further comprising:

a positioning roller rollably contacting a side surface of said second roll ring, said positioning roller having an axis of rotation generally transverse to said longitudinal axis of said reactor vessel.

11. The apparatus of claim 1, said heater comprising:

a plurality of heating pipes extending through said interior volume of said reactor vessel; and a heated fluid injector connected to said plurality of heating pipes, said heated fluid injector adapted for passing a heated fluid into said plurality of heating pipes.

12. The apparatus of claim 11, said plurality of heating pipes each extending longitudinally through said reactor vessel adjacent an inner wall of said reactor vessel, each of said plurality of heating pipes having a longitudinal axis in generally parallel relationship with said longitudinal axis of said reactor vessel, each of said plurality of heating pipes being in generally parallel relationship with an adjacent heating pipe.

13. The apparatus of claim 11, said heater further comprising:

a heating fluid inlet manifold formed in said reactor vessel; and a heating fluid discharge manifold formed in said reactor vessel, each of said plurality of heating pipes communicating with said heating fluid inlet manifold and with said heating fluid discharge manifold.

14. The apparatus of claim 13, each of said plurality of heating pipes comprising:

an outer pipe having an interior passage communicating with said heating fluid inlet manifold; and an inner pipe extending interior of said outer pipe, said inner pipe communicating with said heating fluid discharge manifold, said inner pipe opening to said outer pipe at an end opposite said heating fluid discharge manifold.

15. The apparatus of claim 11, said heating injector further comprising:

a heated fluid supply tank; and a pump connected to said heated fluid supply tank, said pump interconnected to said plurality of heating pipes, said pump adapted for passing heated fluid from said heated fluid supply tank to said plurality of heating pipes.

16. The apparatus of claim 1, said outlet of said reactor vessel being positioned on a wall adjacent an end of said reactor vessel, said inlet being positioned generally centrally at an opposite end of said reactor vessel.

17. The apparatus of claim 6, further comprising:

a load sensor positioned on said base, said load sensor adapted for sensing a weight of a material introduced into said reactor vessel.

18. An apparatus for converting PET into polyester polyols comprising:

a reactor vessel having an interior volume, said reactor vessel having an inlet and an outlet, a plurality of heating pipes extend through said interior volume of said reactor vessel;

a rotation device connected to an exterior of said reactor vessel, said rotation device adapted for rotating said reactor vessel; and a heated fluid injector connected to said plurality of heating pipes, said heated fluid injector adapted for passing a heated fluid into said plurality of heating pipes so as to elevate a temperature of said interior volume to at least 175° C.

19. The apparatus of claim 18, said reactor vessel having a longitudinal axis extending generally horizontally.

20. The apparatus of claim 18, said inlet being positioned at one end of said reactor vessel generally centrally of said one end, said outlet opening at a wall of said reactor vessel adjacent an opposite end of said reactor vessel.

21. The apparatus of claim 18, said plurality of heating pipes each extending longitudinally through said reactor vessel adjacent an inner wall of said reactor vessel, each of said plurality of heating pipes having a longitudinal axis in generally parallel relationship with said longitudinal axis of said reactor vessel, each of said plurality of heating pipes being in generally parallel relationship with an adjacent heating pipe.

22. The apparatus of claim 18, said heated fluid injector further comprising:

a heating fluid inlet manifold formed in said reactor vessel; and a heating fluid discharge manifold formed in said reactor vessel, each of said plurality of heating pipes communicating with said heating fluid inlet manifold and with said heating fluid discharge manifold.

23. The apparatus of claim 22, each of said plurality of heating pipes comprising:

an outer pipe having an interior passage communicating with said heating fluid inlet manifold; and an inner pipe extending interior of said outer pipe, said inner pipe communicating with said heating fluid discharge manifold, said inner pipe opening to said outer pipe at an end opposite said heating fluid discharge manifold.

24. The apparatus of claim 18, said heated fluid injector further comprising:

a heated fluid supply tank; and a pump connected to said heated fluid supply tank, said pump interconnected to said plurality of heating pipes, said pump adapted for passing heated fluid from said heated fluid supply tank to said plurality of heating pipes.

25. The apparatus of claim 18, further comprising:

a platform supporting said reactor vessel;

a base positioned below said platform, said base supporting said platform in a desired orientation; and a pivoting mechanism connected to said base and said platform, said pivoting mechanisms for moving said reactor vessel angularly such that said inlet of said reactor vessel resides at a higher elevation above said base than said outlet.

26. The apparatus of claim 18, said rotation device comprising:

a roll ring affixed circumferentially around said reactor vessel;

a driver roller engaging said roll ring; and a motor connected to said drive roller, said motor adapted for drivingly rotating said driver roller so as to consequently rotate said roll ring.

27. A process for converting PET into polyester polyols comprising:

forming a reactor vessel having an inlet and an outlet, said reactor vessel having an interior volume;

loading a glycol into said interior volume;

loading PET into said interior volume;

heating said interior volume of said reactor vessel to a temperature of at least 175° C.;

rotating said reactor vessel so as to mix said glycol and said PET in the heated interior volume for a desired period of time; and discharging the polyester polyols from said reactor vessel.

28. The process of claim 27, said step of rotating comprising:

rotating said reactor vessel around a horizontal axis.

29. The process of claim 27, said step of forming comprising:

affixing a plurality of heating pipes in said reactor vessel such that said plurality of heating pipes extends longitudinally through said interior volume.

30. The process of claim 29, said step of heating comprising:

passing a heated fluid through said plurality of heating pipes during said step of rotating.

31. The process of claim 27, further comprising:

angularly elevating said inlet during said step of loading PET.

32. The process of claim 27, further comprising:

heating said glycol prior to said step of loading PET into said interior volume.

* * * * *